US011988042B2

(12) United States Patent
Janick et al.

(10) Patent No.: US 11,988,042 B2
(45) Date of Patent: May 21, 2024

(54) CLOSURE LOCKING SYSTEM

(71) Applicant: CornellCookson, LLC, Mountain Top, PA (US)

(72) Inventors: James Janick, Mountain Top, PA (US); Brandon C. Smith, Mountain Top, PA (US); John Bullen, Mountain Top, PA (US)

(73) Assignee: CornellCookson, LLC, Mountain Top, PA (US)

( * ) Notice: Subject to any disclaimer, the term of this patent is extended or adjusted under 35 U.S.C. 154(b) by 254 days.

(21) Appl. No.: 17/122,530

(22) Filed: Dec. 15, 2020

(65) Prior Publication Data

US 2021/0180402 A1 Jun. 17, 2021

Related U.S. Application Data

(60) Provisional application No. 62/948,462, filed on Dec. 16, 2019.

(51) Int. Cl.
*E06B 9/86* (2006.01)
*E05B 47/00* (2006.01)

(52) U.S. Cl.
CPC ............ *E06B 9/86* (2013.01); *E05B 47/0002* (2013.01)

(58) Field of Classification Search
CPC ............................... E06B 9/86; E05B 47/0002
See application file for complete search history.

(56) References Cited

U.S. PATENT DOCUMENTS

| | | | | |
|---|---|---|---|---|
| 4,237,711 | A * | 12/1980 | Kambic | E05B 47/0002 70/432 |
| 5,720,333 | A | 2/1998 | Turvey | |
| 8,646,816 | B2 * | 2/2014 | Dziurdzia | E05B 17/0029 292/216 |
| 9,458,647 | B2 * | 10/2016 | Gartner | E05B 47/0607 |
| 9,617,755 | B2 * | 4/2017 | Peabody | E05B 47/0046 |
| 10,233,671 | B2 * | 3/2019 | Du | E05B 21/00 |
| 10,246,904 | B1 * | 4/2019 | White | E05F 15/77 |

(Continued)

FOREIGN PATENT DOCUMENTS

WO 2019067935 A2 4/2019

OTHER PUBLICATIONS

International Search Report and Written Opinion dated Mar. 12, 2021 for International Patent Application No. PCT/US20/65091, 10 pages.

*Primary Examiner* — Mark A Williams

(57) ABSTRACT

A lock module comprising a housing, a lock pawl, and an actuator. The lock pawl may be moveable between an extended position and a retracted position, wherein the lock pawl extends from the housing by a greater distance in the extended position than in the retracted position. The actuator may be configured to selectively couple to the lock pawl, the lock module being in a locked configuration when the actuator is coupled to the lock pawl. The lock pawl may be configured to move in a first direction as a closure moves from a first position to a second position and the lock pawl may be configured to move in a second direction as the closure moves from the second position to the first position. The first direction may be opposite the second direction. The lock pawl may be configured to block movement of the closure when the lock module is in the locked configuration.

18 Claims, 11 Drawing Sheets

(56) References Cited

U.S. PATENT DOCUMENTS

2009/0235767 A1* 9/2009 Garneau ................. E05B 65/46
292/201
2011/0252844 A1 10/2011 Shoemaker
2012/0261081 A1* 10/2012 Curtis ................. E05B 47/0607
292/201
2016/0047148 A1* 2/2016 Aker ................... E05B 47/0603
292/220
2017/0067271 A1* 3/2017 Schroeder ........... E05B 47/0004
2017/0292294 A1* 10/2017 Brennan ................. E05B 63/18
2018/0023322 A1* 1/2018 Curtis ................. E05B 47/0004
292/215
2018/0119455 A1* 5/2018 Miller ................. E05B 63/0052

* cited by examiner

CLOSURE LOCKING SYSTEM

FIELD OF THE INVENTION

The present invention generally relates to a locking system and, more particularly, to a locking system configured to secure a closure.

BRIEF SUMMARY OF THE INVENTION

In one embodiment there is a lock module comprising a housing, a lock pawl, and an actuator. The lock pawl may be moveable between an extended position and a retracted position, wherein the lock pawl extends from the housing by a greater distance in the extended position than in the retracted position. The actuator may be configured to selectively couple to the lock pawl, the lock module being in a locked configuration when the actuator is coupled to the lock pawl. The lock pawl may be configured to move in a first direction as a closure moves from a first position to a second position and the lock pawl may be configured to move in a second direction as the closure moves from the second position to the first position. The first direction may be opposite the second direction. The lock pawl may be configured to block movement of the closure when the lock module is in the locked configuration.

The actuator may include a translatable portion that is configured to translate along an axis and the lock pawl may be configured to pivot about a lock pawl axis. The actuator may be a powered actuator. The powered actuator may be a solenoid. The lock pawl may be biased toward the extended position. In a further embodiment, the lock module includes a biasing element coupled to the lock pawl and the biasing element may bias the lock pawl toward the extended position. In a further embodiment, the lock module includes a blocking element coupled to the actuator, the blocking element configured to block movement of the lock pawl in the first direction from the extended position to the retracted position. The actuator may be configured to move the blocking element from a first position to a second position along a blocking element path. The lock pawl may include a lip and the blocking element may engage the lip to prevent movement of the lock pawl in the first direction from the extended position to the retracted position. The blocking element may be biased toward the first position. The lock module may be configured to be fail secure. The lock module may be configured to be fail safe.

In a further embodiment, the lock module includes a sensor configured to sense when the blocking element is in the second position. The sensor may be configured to transmit a signal to a processor that is configured to allow operation of a closure motor after transmission of the signal. The lock pawl may be configured to pivot about a lock pawl axis as the lock pawl moves between the extended position and the retracted position. The lock pawl may be in the extended position as the actuator moves the blocking element from the first position to the second position.

In a further embodiment, a closure assembly includes a first frame configured to be coupled to a wall defining a portion of an opening, a closure configured to be coupled to the frame, and the lock module. The closure may be moveable from an open position wherein the closure allows access through the opening to a closed position wherein the closure at least partially obstructs the opening. The actuator may be coupled to the first frame. The actuator may be positioned within a housing and the housing may be coupled to the first frame. The closure may include a bottom bar and the bottom bar may engage the lock pawl. The bottom bar may be configured to move the lock pawl from the extended position to the retracted position.

In a further embodiment, the closure assembly includes a second frame coupled to a wall defining another portion of the opening and the bottom bar is configured to substantially extend from the first frame to the second frame. The lock pawl may be configured to pivot about a lock pawl axis as the lock pawl moves between the extended position and the retracted position. The lock pawl axis may be substantially parallel to the bottom bar. The frame may include a closure track such that the closure moves within the closure track between the open position and the closed position. The lock pawl may extend into the closure track when the lock pawl is in the extended position. The lock pawl may be at least partially out of the closure track when the lock pawl is in the retracted position. In a further embodiment, the closure assembly includes a controller configured to send an activation signal to the actuator. In a further embodiment, the closure assembly includes a manual actuator configured to move the lock pawl from the extended position to the retracted position.

BRIEF DESCRIPTION OF THE SEVERAL VIEWS OF THE DRAWINGS

The foregoing summary, as well as the following detailed description of embodiments of the closure locking system, will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE INVENTION

Figure 1:
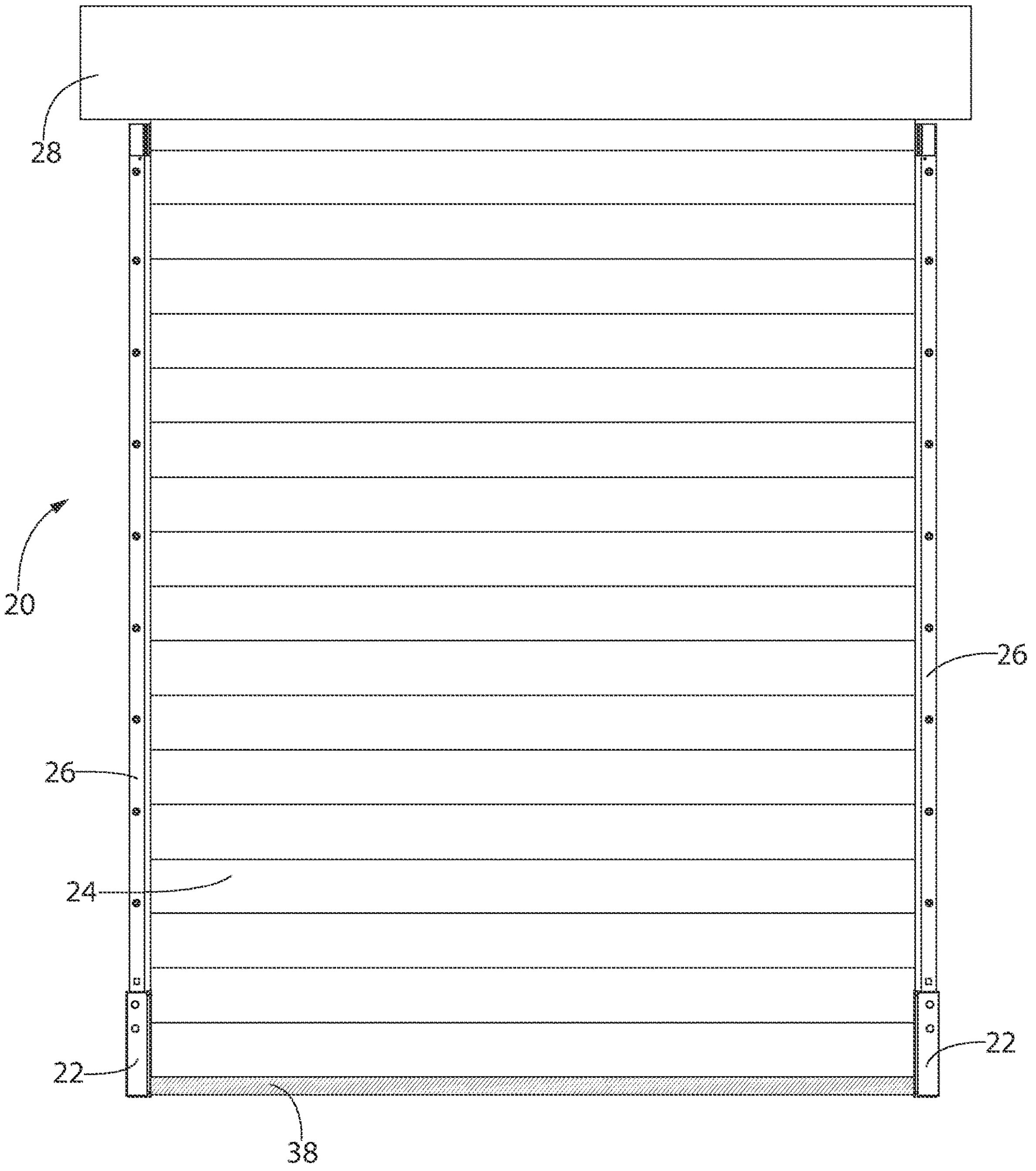
FIG. 1 is a front elevational view of a closure locking system in accordance with an exemplary embodiment of the present invention with the closure in the closed position.

A closure may be configured to seal an opening to restrict passage of unwanted persons or objects. In some embodiments, a closure locking system is configured to secure the closure in a selected position (e.g., a closed or partially closed position). In some embodiments, a closure locking system automatically locks the closure as the closure moves from a first position (e.g., open position) toward a second position (e.g., an extended position). For example, the closure locking system may include a lock assembly having a lock pawl configured to prevent movement of the closure to the first position when the lock pawl is in a locked configuration.

Referring to the drawings in detail, wherein like reference numerals indicate like elements throughout, there is shown in FIGS. 1-9 a closure locking system, generally designated 20, in accordance with an exemplary embodiment of the present invention.

Figure 2:
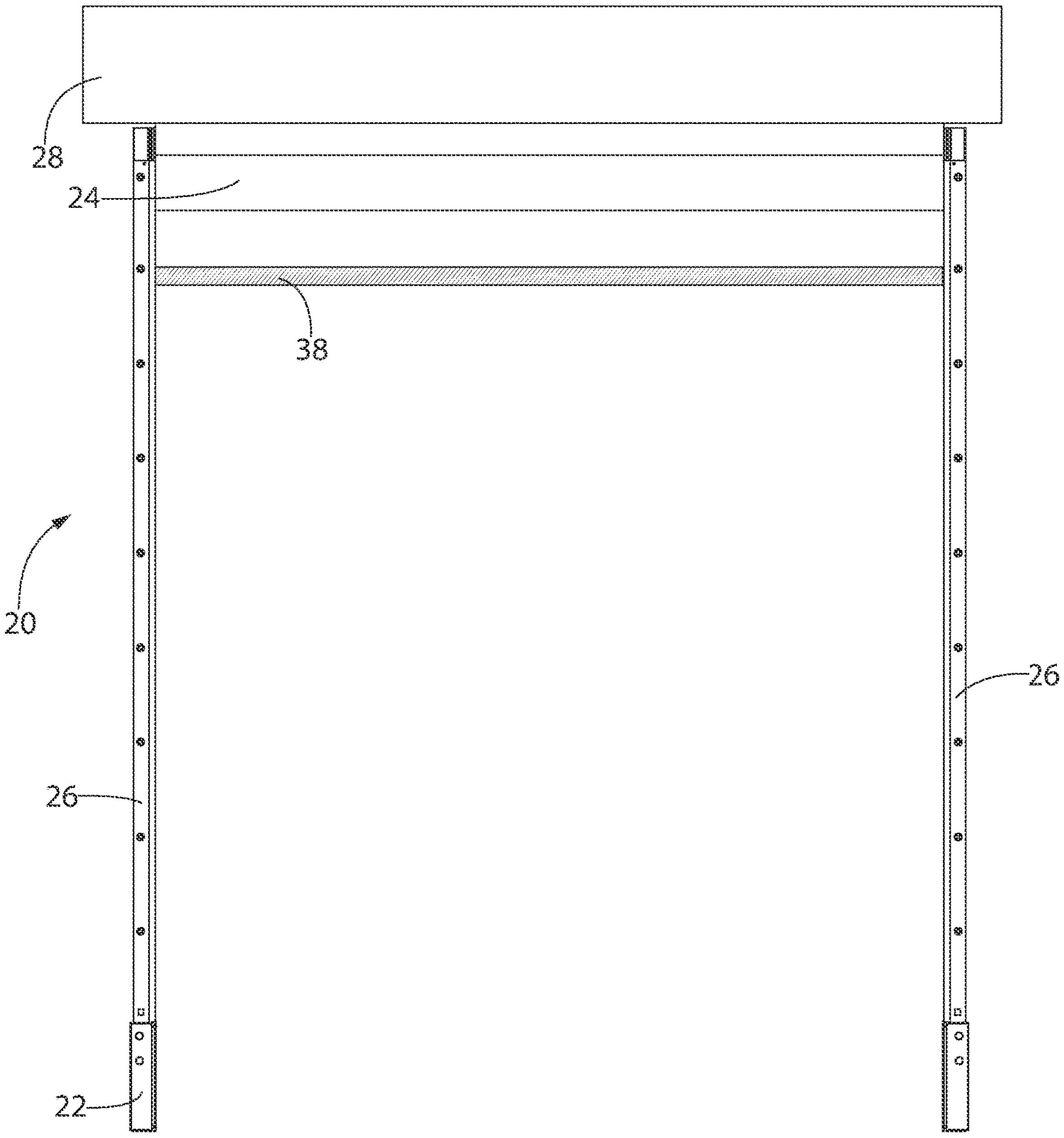
FIG. 2 is a front elevational view of the closure locking system of FIG. 1 with the closure in a retracted position.

Referring to FIGS. 1-2, in some embodiments, the closure locking system 20 includes a closure 24 (e.g., a grille, curtain, door) configured to seal or obscure an opening (e.g., a window, door, roof opening, accessway). In some embodiments, the closure 24 is moveable between a first or open position (FIG. 2) to allow passage through an opening; and a second or closed position (FIG. 1) where the closure 24 prevents the passage of objects. In some embodiments, the closure 24 can be locked in the second position to prevent unauthorized movement of the closure 24 from the second position to the first position. In some embodiments, a portion of the closure 24 may be within a hood 28 when the closure 24 is in the first position. For example, the closure 24 may coil about itself and/or about a shaft within the hood 28 as the closure moves from the second position to the first position.

Figure 3:
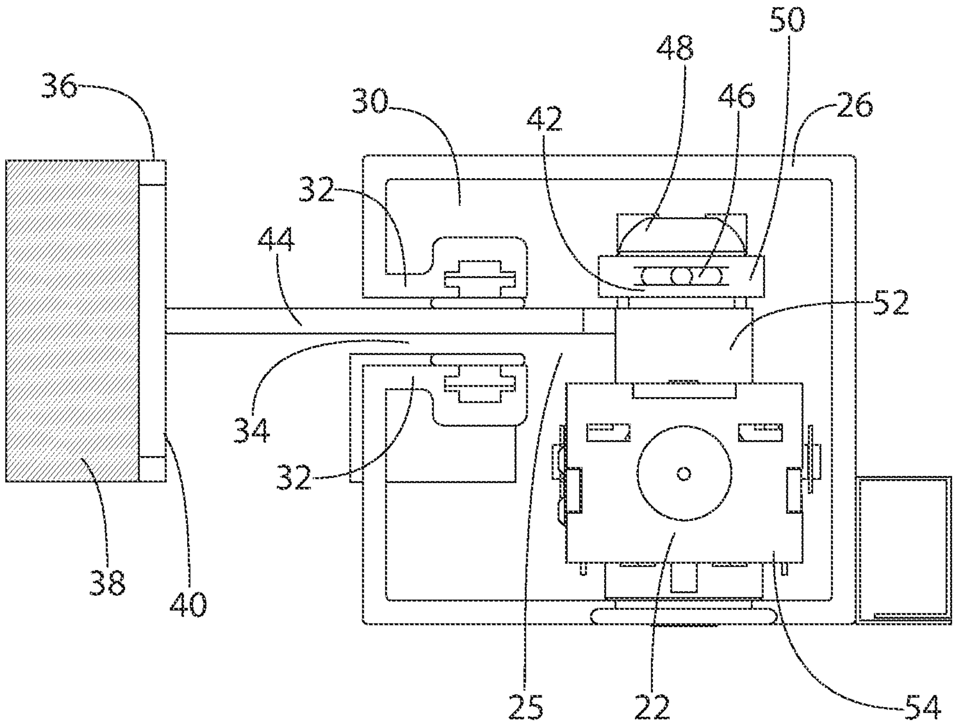
FIG. 3 is a bottom elevational view of the lock module and bottom bar of FIG. 1.

Referring to FIGS. 1-3, in some embodiments, the closure locking system 20 includes a frame 26 on one or both sides of the opening. In some embodiments, the frame 26 defines a closure track 25. In some embodiments, at least a portion of the closure 24 is configured to move within the closure track 25 as the closure 24 moves between the second position and the first position. For example, FIG. 3 shows a top view of one embodiment of the closure locking system 20 where the frame 26 defines a recess 30 and a portion of the closure 24 is within the recess 30 as the closure 24 moves between the first position and the second position. In some embodiments, the frame 26 is configured to retain a portion of the closure 24 within the frame 26. For example, the frame 26 may include a sidewall 32 that defines an entry 34 to the recess 30 and the entry 34 may be narrower than the recess 30. In some embodiments, the closure is configured to engage the sidewall 32 such that a portion of the closure 24 is retained within the recess 30. For example, the closure 24 may include an end cap 36 having a width that is greater than the width of the recess 30 and thus could not be pulled out through the recess 30.

In some embodiments, a portion of the closure 24 is flexible. In some embodiments, the closure 24 includes a rigid element at or near a bottom of the closure 24 configured to interact with a locking mechanism to keep the closure 24 in the closed position. Referring to FIGS. 1-2, for example, the closure 24 may include a bottom bar 38 that is more rigid (e.g., more resistant to deflection from a horizontal or vertical force) than another portion of the closure 24. In some embodiments, the bottom bar 38 is resistant to prying. In some embodiments, the end cap 36 is coupled to the bottom bar 38. For example, the end cap 36 may be coupled to the bottom bar 38 via adhesive, weld, rivet, or threaded fastener. In some embodiments, frame 26 includes a first frame coupled to a first sidewall of the opening and a second frame coupled to a second sidewall of the opening. In some embodiments, the bottom bar 38 is configured to extend substantially from the first frame to the second frame. In some embodiments, a major axis of the bottom bar extends from the first frame toward the second frame. In some embodiments, the major axis of the bottom bar 38 is the longest length of the bottom bar 38.

In some embodiments, the end cap 36 is configured to keep the bottom bar 38 engaged with the frame 26. For example, the end cap 36 may be sized and dimensioned such that the end cap 36 remains engaged with the frame 26 when a horizontal or vertical force is applied to the closure 24 or bottom bar 38. Referring to FIG. 3, in some embodiments, the end cap 36 includes a dog bone shape. For example, a first end 40 and a second end 42 of the end cap 36 may be each have a width that is greater than a width of a middle portion 44. In some embodiments, the first end 40 is coupled to the bottom bar 38. In some embodiments, the second end 42 includes a protuberance 46 that engages the sidewall 32 of the frame 26. For example, the protuberance 46 may include a fastener 48 and a collar 50 that is wider than the entry 34. In some embodiments, the collar 50 is manufactured from brass, steel, stainless steel, or aluminum. In some embodiments, the protuberance 46 engages the sidewall 32 and keeps the end cap 36 engaged with the frame 26 if a force (e.g., a horizontal or vertical force) is applied to the closure 24 or bottom bar 38. In some embodiments, the end cap 36 maintains engagement of the bottom bar 38 and frame 26 when a force of up to about 1 pound to about 100 pounds, about 100 pounds to about 500 pounds, about 500 pounds to about 1,000 pounds, about 1,500 pounds to about 2,000 pounds, about 2,000 pounds to about 2,500 pounds, about 2,500 pounds to about 3,000 pounds, about 3,000 pounds to about 3,500 pounds, about 3,500 pounds to about 4,000 pounds, about 4,000 pounds to about 4,500 pounds, about 4,500 pounds to about 5,000 pounds, about 1 pound to about 2,500 pounds, about 2,500 pounds to about 5,000 pounds, or less than 5,000 pounds is applied to the bottom bar 38 or closure 24.

In some embodiments, lock module 22 is coupled to frame 26. The lock module 22 may be configured to prevent movement of the closure 24 from the second position to the first position. In some embodiments, the lock module 22 is configured to engage the bottom bar 38 and/or end cap 36 when the lock module 22 is in a locked configuration. In some embodiments, the lock module 22 is positioned within (or substantially within) the frame 26. In some embodiments, at least a portion of the lock module 22 is positioned adjacent to the frame 26. In some embodiments, the lock module 22 is positioned at or near a bottom of the frame 26. In some embodiments, lock module 22 extends along a portion of frame 26. In other embodiments, the lock module 22 is positioned between the top and bottom of the frame 26. In some embodiments, the lock module 22 is positioned at an ergonomically convenient location (e.g., about 30-54 inches above the ground). In some embodiments, a first lock module 22 is within first frame and a second lock module 22 is within second frame. In some embodiments, the first lock module 22 is at a different height above the ground than second lock module 22.

In some embodiments, the end cap 36 moves along the closure track 25 as the closure 24 moves between the second position and the first position. In some embodiments, the lock module 22 includes a lock pawl 52 positioned at least partially within the closure track 25 (FIG. 3). In some embodiments, the closure track 25 is an area defined by the frame 26 within which the end cap 36 moves as the closure 24 moves between the first position and the second position. In some embodiments, the closure track 25 extends the length of the frame 26. In other embodiments, the closure track 25 extends partially along the frame 26.

Figure 6:
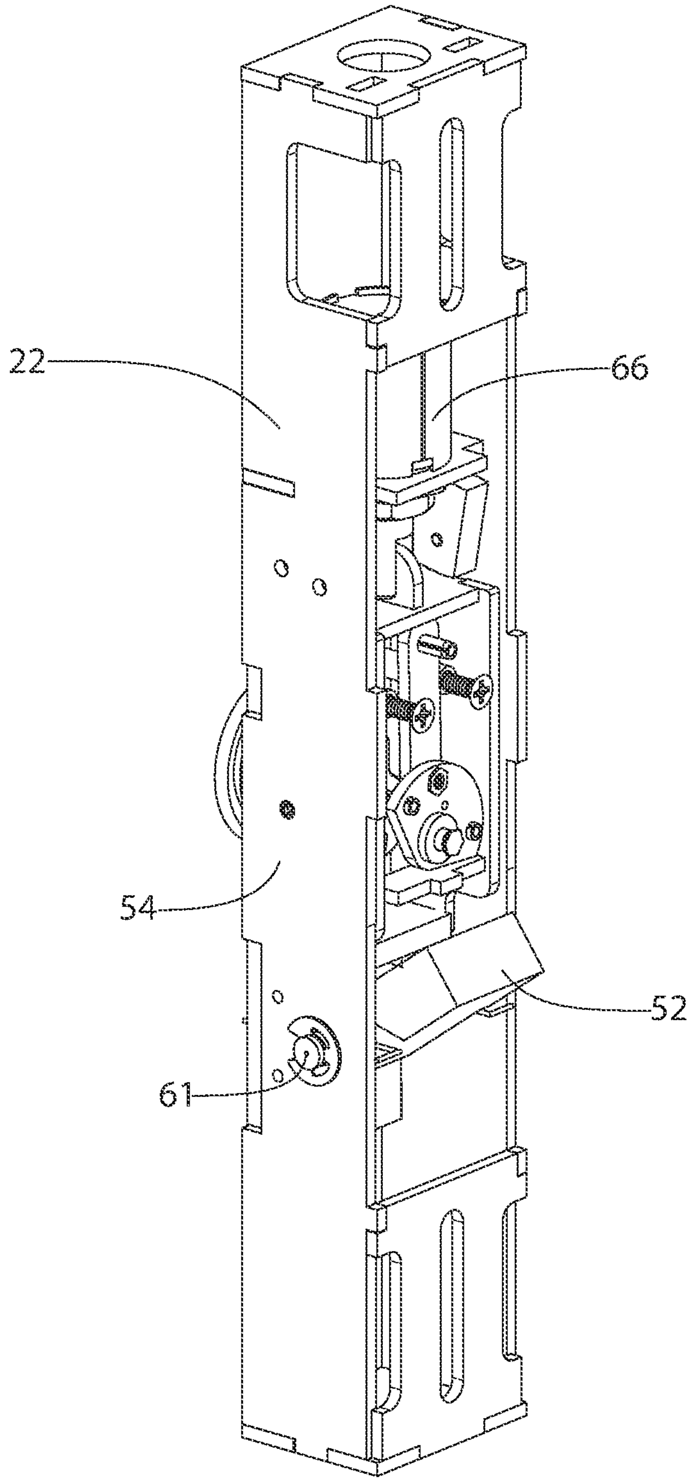
FIG. 6 is a side perspective view of the lock module of FIG. 1 with the lock pawl in a retracted position.

In some embodiments, the lock pawl 52 is moveable between an extended position (FIG. 4) and a retracted position (FIG. 6). In some embodiments, the lock pawl 52 in the extended position extends into the closure track 25. In some embodiments, the lock pawl 52 is configured to block movement of the closure 24 when the lock pawl 52 is in a lock configuration, as explained in greater detail below.

Figure 10:
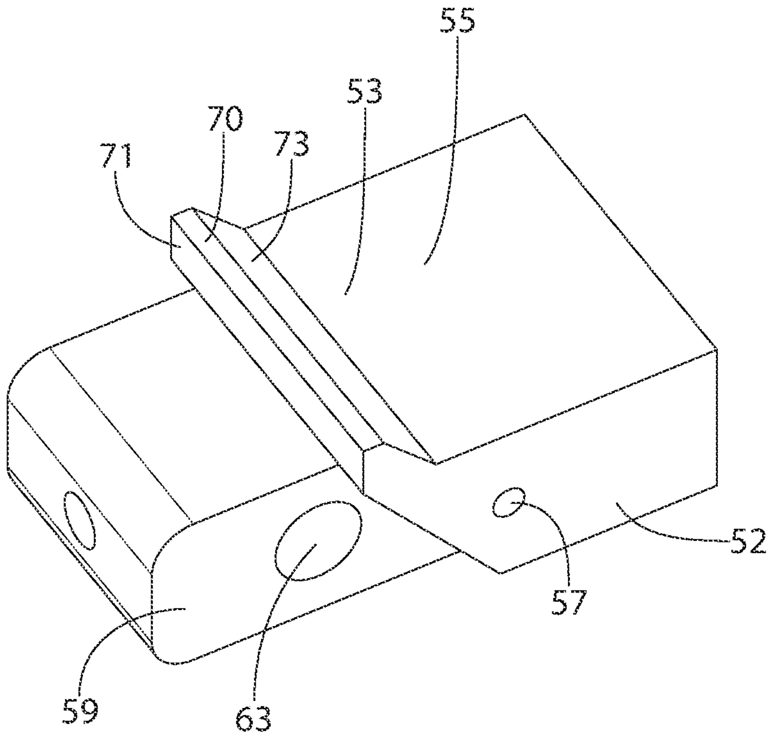
FIG. 10 is a side perspective view of the lock pawl.

Referring to FIG. 10, in some embodiments, the lock pawl 52 includes a body 53 having a first end and a second end. In some embodiments, the body 53 includes an outer surface 55 and a lip 70 extends away (e.g., upwardly when at least a portion of the lock pawl 52 is within the closure track) from the outer surface 55. In some embodiments, the lip 70 includes a front surface 73 and a rear surface 71. The front surface 73 may be disposed at a first angle (e.g., an oblique angle) relative to the outer surface 55 of the body. The rear surface 71 of the lip 70 may be disposed at a second angle (e.g., perpendicular or close to perpendicular) relative to the outer surface of the body. The first angle may be different than the second angle. The rear surface 71 of the lip 70 may be disposed at the second angle such that when the rear surface 71 of the lip 70 engages the blocking element 68, the lock pawl 52 is prevented from rotating.

Figure 11:
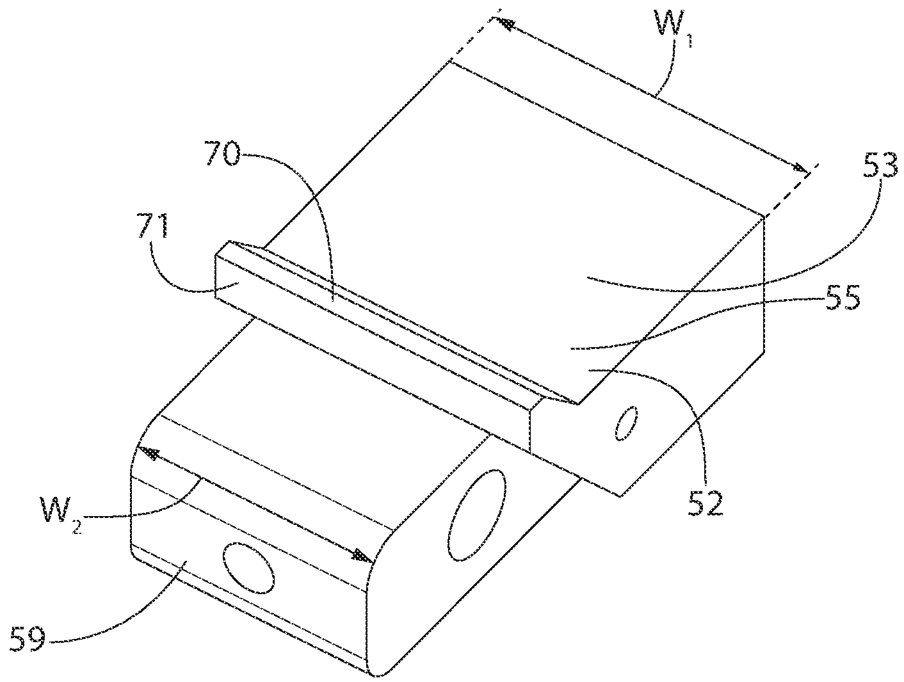
FIG. 11 is a rear perspective view of the lock pawl.

In some embodiments, the lock pawl 52 includes one or more apertures 57 to receive a biasing element, as explained in greater detail below. In some embodiments, apertures 57 are disposed on opposing sides of the lock pawl 52. In some embodiments, the lock pawl 52 includes a tongue 59 extending from the body 53. In some embodiments, the body 53 includes a body width $W_1$ and the tongue 59 includes a tongue width $W_2$ (FIG. 11). In some embodiments, the body width $W_1$ is greater than the tongue width $W_2$. In some embodiments, the tongue 59 includes an opening 63 (FIG. 10). In some embodiments, the opening 63 is configured to receive an axle such that the lock pawl 52 can rotate about the axle as the lock pawl moves between the extended position and the retracted position.

In some embodiments, the lock module 22 includes a housing 54. In some embodiments, the housing 54 is coupled to the frame 26. In some embodiments, the lock pawl 52 extends from the housing 54 by a greater distance in the extended position than in the retracted position. In some embodiments, a portion of the lock pawl 52 (e.g., body 53) extends from the housing 54 by a distance of about 0.1 inches to about 0.25 inches, about 0.25 inches to about 0.5 inches, about 0.5 inches to about 0.75 inches, about 0.75 inches to about 1 inch, about 1 inch to about 1.5 inches, about 1.5 inches to about 2 inches, or less than about 2 inches when the lock pawl 52 is in the extended position. In some embodiments, the housing 54 is positioned at least partially within the frame 26. In some embodiments, the frame 26 forms at least a portion of the housing 54. In some embodiments, the frame 26 is positioned between the closure 24 and the housing 54. In some embodiments, the lock pawl 52 extends into the closure track 25 when the lock pawl 52 is in the extended position. In some embodiments, the lock pawl 52 is at least partially out of the closure track 25 when the lock pawl 52 is in the retracted position.

In some embodiments, the lock pawl 52 is configured to move in either of a first direction or a second direction as the closure 24 moves between the first position and the second position. In some embodiments, the lock pawl 52 is configured to move in a first direction as the closure 24 moves from the first position to the second position. In some embodiments, the lock pawl 52 is configured to move in a second direction as the closure 24 moves from the second position to the first position. In some embodiments, the first direction is opposite the second direction. In some embodiments, the bottom bar 38 or end cap 36 move the lock pawl 52 from the extended position to the retracted position.

Figure 4:
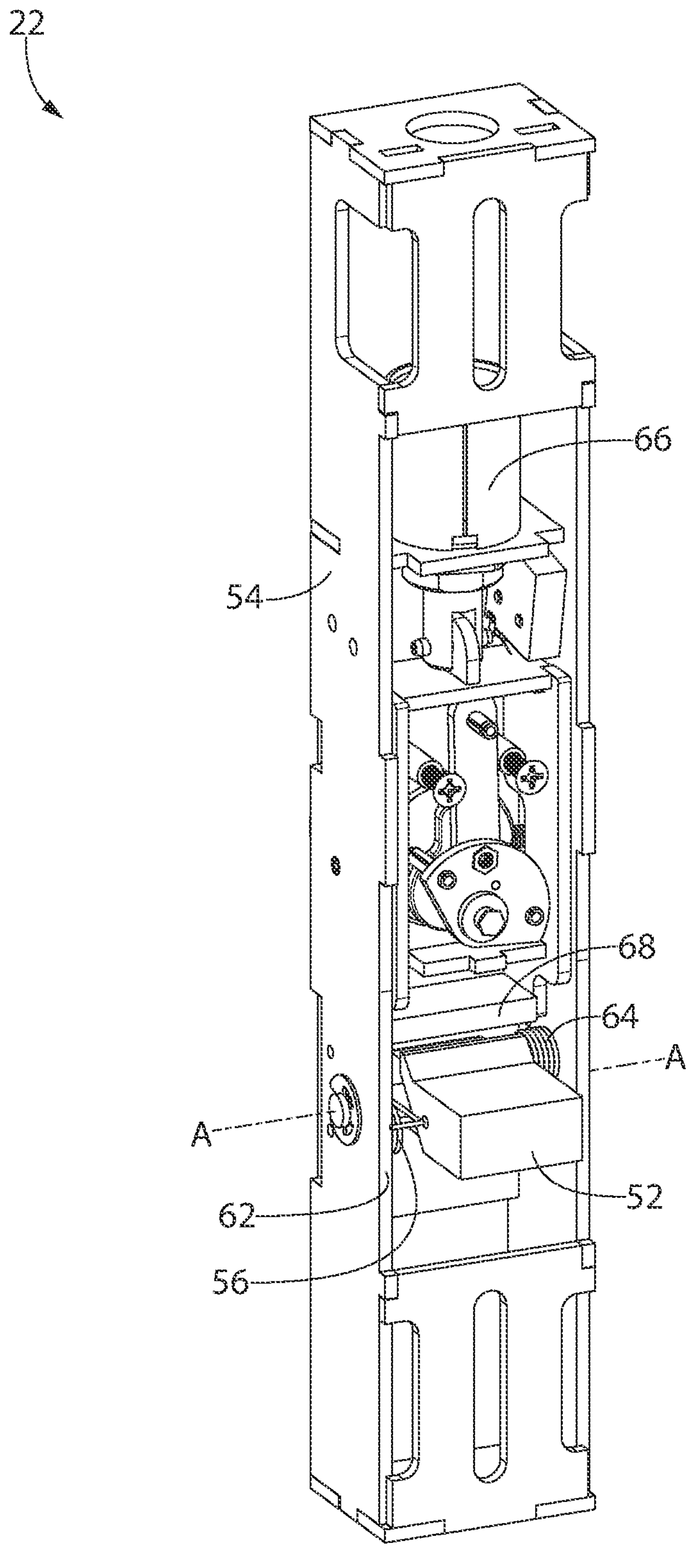
FIG. 4 is a front perspective view of the lock module of FIG. 1.

In some embodiments, lock pawl 52 is configured to pivot about a lock pawl axis A-A (FIG. 4). In some embodiments, the lock pawl 52 pivots about the lock pawl axis A-A as the lock pawl 52 moves between the extended position and the retracted position. In some embodiments, lock pawl axis A-A is substantially parallel to the major axis of the bottom bar 38. In other embodiments, the lock pawl axis A-A is transverse to the major axis of the bottom bar 38. In some embodiments, the lock pawl 52 pivots in a first direction 58 (FIG. 5) as the closure 24 moves from the first position (e.g., open position) to the second position (e.g., closed position). In some embodiments, the lock pawl 52 pivots in a second direction 60 as the closure moves from the second position to the first position.

In some embodiments, the lock pawl 52 is biased toward the extended position. For example, the lock module 22 may include a biasing element assembly 56 coupled to the lock pawl 52 and biasing the lock pawl 52 toward the extended position. In some embodiments, the biasing element assembly 56 includes one or more than one biasing element. In some embodiments, the biasing element assembly 56 includes a first biasing element 62. In some embodiments, the biasing element assembly 56 includes a second biasing element 64. In some embodiments, the first biasing element 62 and the second biasing element 64 bias the lock pawl 52 in opposite directions. In some embodiments, the biasing forces from the first biasing element 62 and the second biasing element 64 are at equilibrium when the lock pawl 52 is in the extended position. In some embodiments, first biasing element 62 and second biasing element 64 are substantially identical but oriented in opposite directions to maintain a neutral position of the lock pawl 52.

In some embodiments, the neutral position of the lock pawl 52 is the position where the first biasing element 62 and the second biasing element 64 acting on the lock pawl 52 are in equilibrium. In some embodiments, the lock pawl 52 extends generally perpendicularly away from the frame 26 in the neutral position. In other embodiments, the lock pawl 52 extends away at an angle (e.g., at an angle other than 90°). In some embodiments, the lock pawl 52 remains in the neutral position until a force (e.g., contact from the bottom bar 38 or end cap 36) moves the lock pawl 52 from the neutral position.

In some embodiments, body width $W_1$ is selected such that the body extends substantially across the width of the housing 54 of the lock module 22. In some embodiments, the tongue width $W_2$ is selected such that the first biasing element 62 and second biasing element 64 are positioned on the axle between the tongue 59 and a sidewall of the housing 54.

In some embodiments, the first biasing element 62 (e.g., a torsional spring) generates a first biasing force that resists movement of the lock pawl 52 in the first direction. In some embodiments, the second biasing element 64 (e.g., a torsional spring) generates a second biasing force that resists movement of the lock pawl 52 in the second direction. In some embodiments, the first biasing force increases, and the second biasing forces decreases, proportionally to the distance the lock pawl 52 is moved from the extended position toward the retracted position in the first direction 58. In some embodiments, the first biasing force decreases, and the second biasing force increases, proportional to the distance the lock pawl 52 is moved from the extended position toward the retracted position in the second direction 60. In some embodiments, the first biasing force and second biasing force acting in different directions force the lock pawl 52 to the extended position where the first biasing force and second biasing force are at equilibrium.

In some embodiments, the lock module 22 is selectively movable between a locked configuration and an unlocked configuration. In some embodiments, the lock pawl 52 is configured to block movement of the closure 24 when the lock module 22 is in the locked configuration. For example, the lock module 22 in the locked configuration may prevent movement of the end cap 36 such that the closure 24 cannot move from the second position to the first position.

Figure 7:
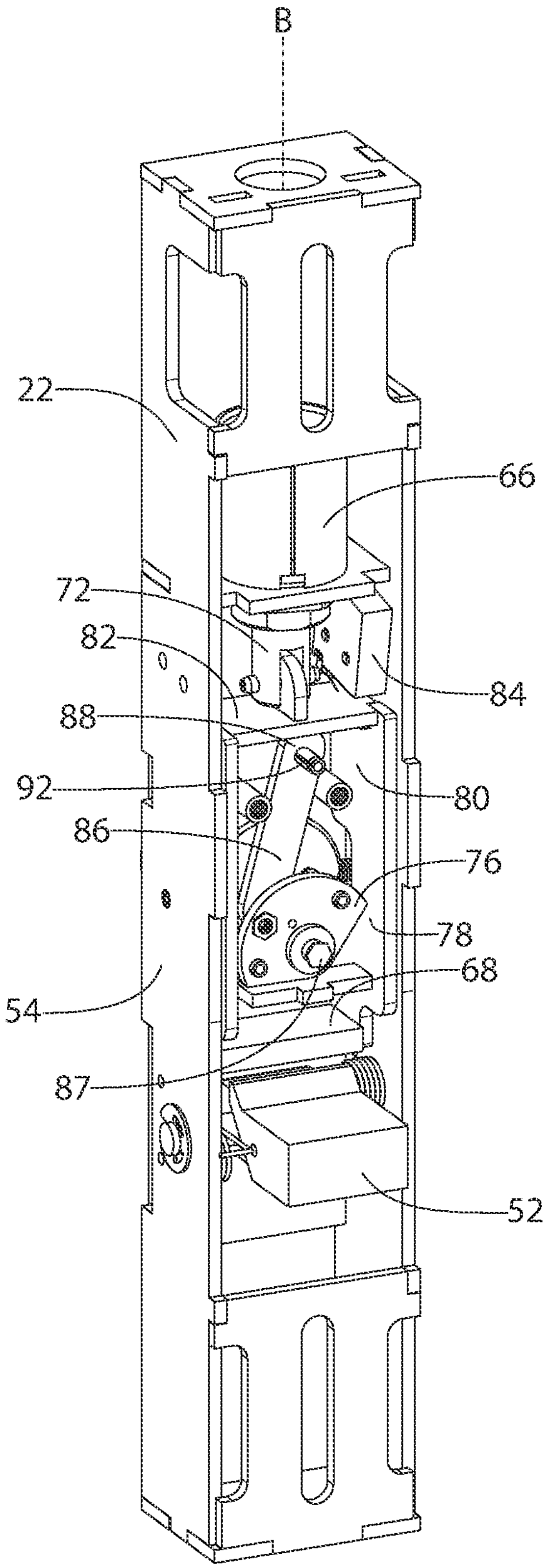
FIG. 7 is a front perspective view of the lock module of FIG. 1 with the blocking element in a second position.

In some embodiments, an actuator 66 is configured to selectively engage the lock pawl 52. In some embodiments, the lock module 22 is in the locked configuration when the actuator 66 engages the lock pawl 52. In some embodiments, the actuator 66 includes a translatable portion 72 configured to translate along axis B-B (FIG. 7). In some embodiments, the translatable portion 72 is configured to translate along axis B-B and the lock pawl 52 is configured to pivot about axis A-A. In some embodiments, axis A-A is transverse to axis B-B. In some embodiments, axis A-A is perpendicular to axis B-B.

In some embodiments, a blocking element 68 is configured to prevent movement of the lock pawl 52. In some embodiments, the blocking element 68 prevents movement of the lock pawl 52 in the second direction 60. In some embodiments, the blocking element 68 prevents movement of the lock pawl 52 in the second direction 60 but allows movement of the lock pawl 52 in the first direction 58. In some embodiments, the blocking element 68 is configured to block movement of the lock pawl 52 in the second direction 60 from the extended position to the retracted position.

Figure 5:
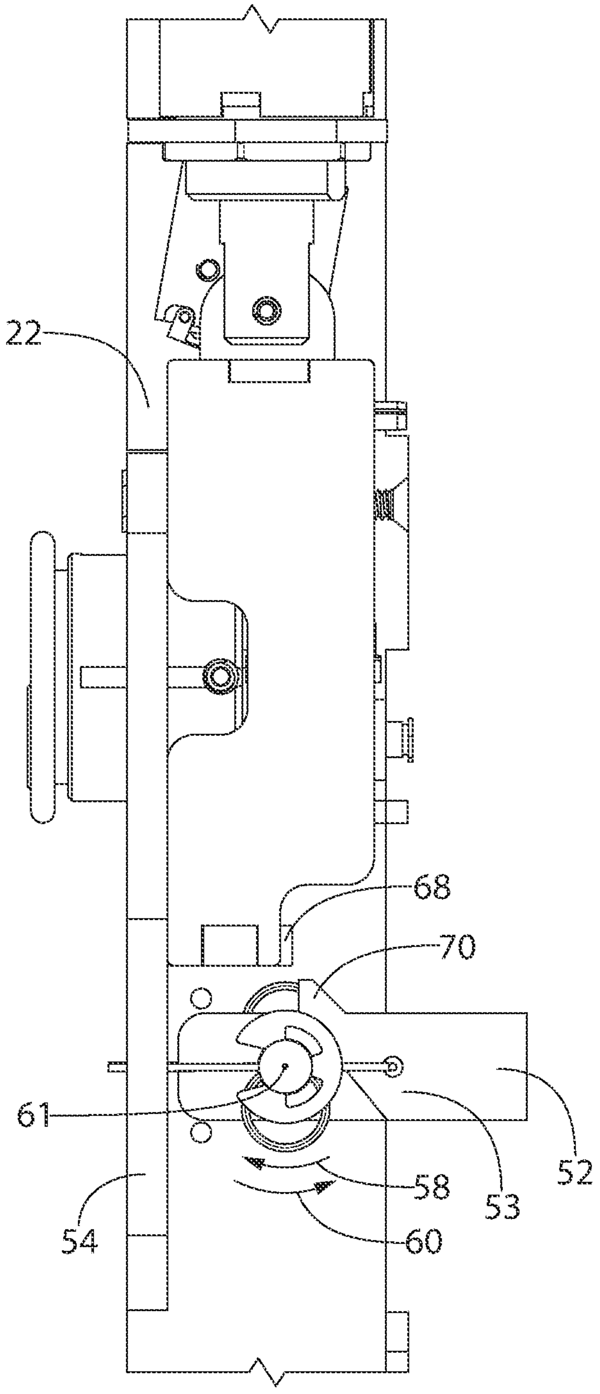
FIG. 5 is a side elevational view of the lock module of FIG. 1.
Figure 8:
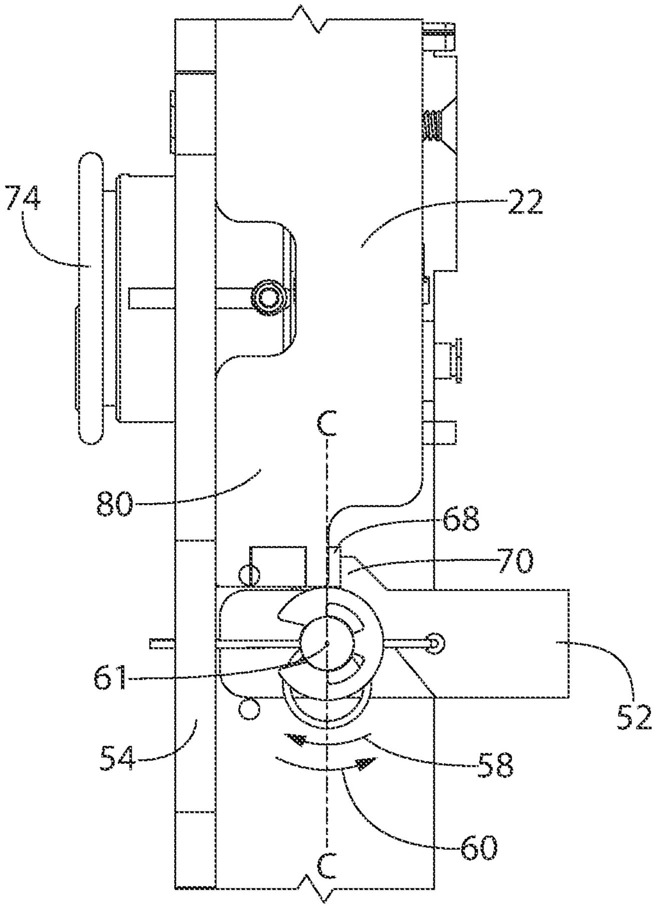
FIG. 8 is a side elevational view of the lock module of FIG. 1 with the blocking element in a first position.
Figure 9:
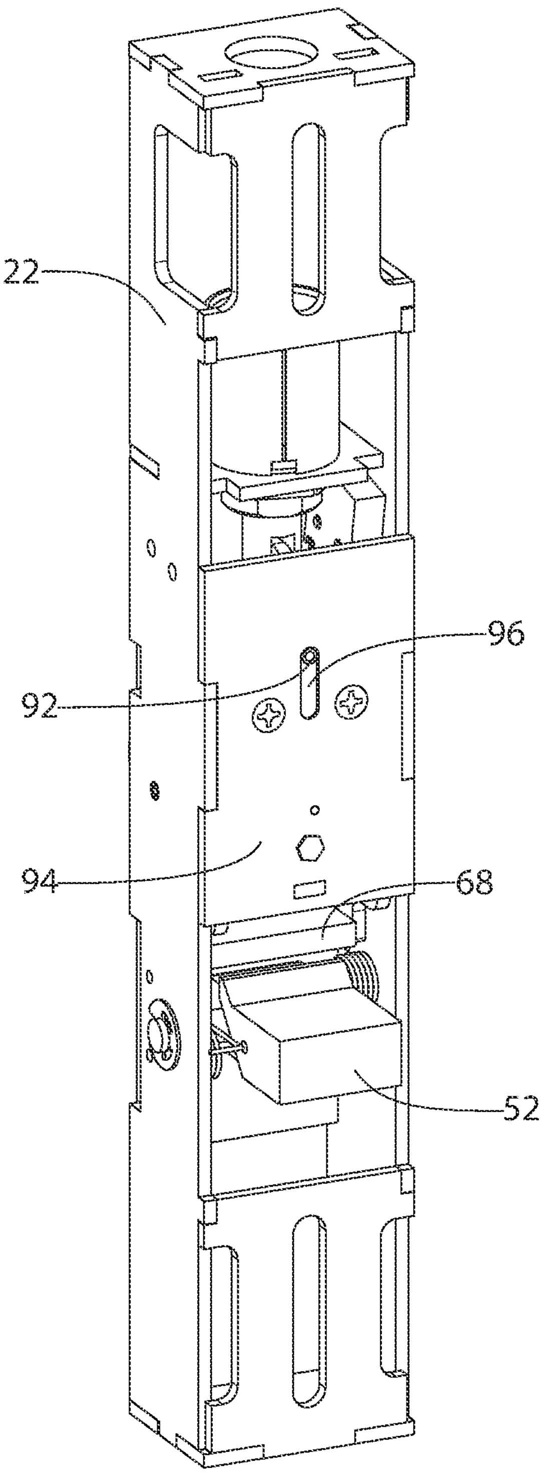
FIG. 9 is a front perspective view of the lock module of FIG. 1 with a cover thereon.

In some embodiments, the blocking element 68 is moveable from a first position (FIGS. 7-8) to a second position (FIGS. 4-5). In some embodiments, the blocking element 68 in the first position prevents movement of the lock pawl 52 in the second direction 60. For example, the blocking element 68 may engage the lip 70 thereby preventing movement (e.g., rotation in the second direction 60) of the lock pawl 52 when the blocking element is in the first position (FIG. 8). In some embodiments, the blocking element 68 has at least one flat or generally flat surface that confronts the rear surface 71 of the lip 70. In some embodiments, the lock pawl 52 rotates about a pivot 61 (FIG. 8). In some embodiments, the lock pawl 52 begins to rotate about the pivot 61 until the flat surface of the blocking element 68 engages the rear surface 71 of the lip 70 thereby blocking further rotation of the lock pawl 52.

In some embodiments, the blocking element 68 extends substantially across the width of the housing 54. In some embodiments, the width of the blocking element 68 is greater than the width of the body 53. In some embodiments, the front surface of the blocking element 68 engages the rear surface 71 of the lip 70. In some embodiments, a rear surface of the blocking element 68 engages a rear wall of the housing 54. In some embodiments, a rear surface of the blocking element 68 contacts a rear wall of the housing 54 such that force from rotation of the lock pawl 52 is transferred to the blocking element 68 and through to the rear wall of the housing 54. In some embodiments, the blocking element 68 includes a depth that is at least about 50%, about 60%, about 70%, about 80%, about 90%, or about 98% of the distance between the rear surface 71 of the lip 70 and the rear wall of the housing 54 (e.g., when the lock pawl 52 is in the extended position).

In some embodiments, the blocking element 68 is closer than the lip 70 to a vertical axis C-C extending through a center of the pivot 61. In some embodiments, a majority of the blocking element 68 is on a first side of the axis C-C and the lip 70 is on a second side of the axis C-C opposite the first side.

In some embodiments, the blocking element 68 is biased toward the first position. In some embodiments, the blocking element 68 is gravity biased toward the first position. In some embodiments, the lock pawl 52 is prevented from rotating in the second direction 60 when the blocking element is in the first position. In some embodiments, the body 53 of the lock pawl 52 is disposed about an axis of rotation. In some embodiments, lock pawl 52 is at least partially rotatable about the axis of rotation. For example, lock pawl 52 can rotate, in some embodiments, in the first direction 58. Lock pawl 52 can rotate, for example, when the blocking element 68 is in the first position. In some embodiments, the lock pawl 52 is configured to rotate in either of the first direction 58 or second direction 60 when the blocking element 68 is in the second position. In some embodiments, the blocking element 68 is biased toward the first position and the closure 24 can be moved from an open position to a closed position when the blocking element is in the first position. In some embodiments, the lock module 22 is fail safe. In other embodiments, the lock module 22 is fail secure.

In some embodiments, the actuator 66 is configured to move the blocking element 68 from the first position to the second position along a blocking element path. In some embodiments, the blocking element 68 moves along a linear axis as the blocking element moves along the blocking element path. In some embodiments, the depth of the blocking element 68, as measured from the rear wall of the housing to the front surface of the blocking element 68, is selected such that the blocking element 68 can move between the first position and the second position when the lock pawl 52 is in the extended position. In some embodiments, the blocking element 68 is in a position outside of the arcuate rotational path of the lock pawl 52 when the blocking element 68 is in the second position. In some embodiments, the lock pawl 52 is in the extended position as the actuator 66 moves the blocking element 68 from the first position to the second position.

In some embodiments, the actuator 66 comprises a powered actuator. In some embodiments, the actuator 66 comprises a solenoid. In other embodiments, the actuator 66 comprises a motor (e.g., direct current motor), an electromagnet, a hydraulic actuator, or a pneumatic actuator.

In some embodiments, the blocking element 68 comprises part of a carriage 78 (FIG. 7). In some embodiments, the carriage 78 defines an open box (e.g., open on at least one side). In some embodiments, the carriage 78 includes a first wall 80 (e.g., a sidewall) and a second wall 82 (e.g., a top wall). In some embodiments, second wall 82 is coupled to the translatable portion 72 of the actuator 66. In some embodiments, second wall extends between the sidewalls of the housing 54. In some embodiments, second wall 82 is positioned opposite the blocking element 68.

In some embodiments, first wall extends between second wall 82 and the blocking element 68. In some embodiments, carriage 78 includes two first walls 80 positioned on opposing sides of the carriage 78. In some embodiments, first wall 80 has a length such that the carriage 78 at least partially surrounds internal components of the closure locking system (e.g., a cam or manual actuator as described in greater detail below). In some embodiments, first wall 80 and blocking element 68 are coupled together via a tongue and groove engagement. In some embodiments, the blocking element 68 is fixed to first wall 80 (e.g., via welding, adhesive, rivet, or fastener). In some embodiments, the carriage 78 is a unitary construct.

In some embodiments, movement of the bottom bar 38 or end cap 36 in a first direction (e.g., vertical) applies a force in the first direction on the body 53 of the lock pawl 52. The force in the first direction (e.g., vertical) causes the lock pawl 52 to rotate or pivot about its axis of rotation. The rear surface 71 of the lip 70 of the lock pawl 52 contacts the flat surface of the blocking element 68 which transforms the force in the first direction to a force in a second direction (e.g., horizontal).

In some embodiments, the rear surface of the blocking element 68 is spaced from a rear wall of the housing 54 and the force applied to the blocking element 68 by the lip 70 is transferred to the first wall 80 of the carriage 78. In other embodiments, the force on the first wall 80 to the frame 26 or sidewall of the opening. In some embodiments, a portion of the lock pawl 52 (e.g., the body 53) extends away from the blocking element 68 at an angle of about 65 degrees to about 115 degrees, about 80 degrees to about 100 degrees, or about 90 degrees when the lock pawl 52 engages the blocking element 68.

In some embodiments, the actuator 66 is coupled to the carriage 78 (e.g., via welding, adhesive, or fastener) such that movement of the translatable portion 72 of the actuator 66 causes movement of the carriage 78. In some embodiments, movement of the carriage 78 causes movement of the blocking element 68 along the blocking element path. In some embodiments, movement of the carriage 78 moves the blocking element 68 between the first position and the second position. In some embodiments, movement of the translatable portion 72 of the actuator 66 simultaneously moves the carriage 78 and blocking element 68.

In some embodiments, the lock module 22 includes a sensor 84 configured to sense when the lock module 22 is in at least one of the locked configuration and the unlocked configuration. In some embodiments, the sensor 84 is a contact sensor. In other embodiments, the sensor 84 is an optical sensor, ultrasonic sensors, capacitive, photoelectric, inductive, or magnetic sensor. In some embodiments, a feedback sensor could be housed within a different actuator. In some embodiments, the sensor 84 senses the presence or absence of the carriage 78. In some embodiments, the sensor 84 senses the presence or absence of the blocking element 68. In some embodiments, the sensor 84 senses a condition associated with the presence or absence of the blocking element 68. In some embodiments, the closure locking system 20 includes a controller and the sensor 84 is configured to send a signal to the controller based on the presence or absence of the carriage 78 or blocking element 68. In some embodiments, the sensor 84 sends a signal to the controller when the blocking element 68 is in the first (e.g., locked) position. In other embodiments, the sensor 84 sends a signal to the controller when the blocking element 68 is in the second (e.g., unlocked) position.

In some embodiments, the controller is configured to send an activation signal to the actuator 66. In some embodiments, the actuator 66 is configured to move the translatable portion 72 in response to receiving the activation signal from the controller. In some embodiments, the lock module 22 is moved from the locked configuration to the unlocked configuration in response to the actuator 66 receiving the actuation signal from the controller. In some embodiments, the controller is hardwired to the actuator 66. In some embodiments, the controller is configured to wirelessly communicate with the actuator 66 (e.g., via BlueTooth, Zigbee, WiFi, or cellular communication network).

In some embodiments, the controller is configured to send an opening signal to an activation means (e.g., a motor) to open the closure 24. In some embodiments, the controller is configured to send the opening signal after receiving a sensor signal from the sensor 84. In some embodiments, the controller is configured to send the opening signal to the activation means at a predetermined time after receiving the sensor signal from the sensor 84. In some embodiments, the predetermined time is about 2 seconds, about 5 seconds, about 10 seconds, about 20 seconds, about 30 seconds, about 45 seconds, about 1 minute, about 2 minutes, or about 5 minutes.

In some embodiments, the lock module 22 includes a manual actuator 74 configured to move the lock module 22 from the locked configuration to the unlocked configuration. In some embodiments, the manual actuator 74 moves the blocking element 68 from the first position to the second position (FIG. 8). For example, the manual actuator 74 may include a manually engagable handle or a key that moves the blocking element 68 from the first position to the second position. In some embodiments, the manual actuator 74 includes a cam 76. In some embodiments, movement (e.g., rotation) of the cam 76 causes the blocking element 68 to move along the blocking element path. In some embodiments, the manual actuator 74 is coupled to an axle 87 such that movement of the manual actuator 74 causes movement of the axle 87 (FIG. 8). For example, rotation of the manual actuator 74 may cause rotation of the axle 87. In some embodiments, movement of the axle 87 causes movement of the cam 76. For example, the cam 76 may be rotationally fixed to the axle 87 such that rotation of the axle 87 causes rotation of the cam 76.

In some embodiments, the cam 76 contacts the second wall 82 such that movement of the cam 76 causes movement of the carriage 78. In other embodiments, the lock module 22 includes a cam follower or link 86. In some embodiments, the link 86 includes a first end 88 and a second end opposite the first end 88. In some embodiments, the second end is coupled to the cam 76.

In some embodiments, the lock module 22 includes a cover 94 (FIG. 9) with a track 96. The cover 94 may be coupled to one or more sidewalls of the housing 54. The cover 94 may extend across the width of the housing 54 to prevent access to the internal components of the closure locking system 20. In some embodiments, the cover 94 is axially fixed relative to the housing 54. In some embodiments, track 96 is a vertical or generally vertical slot.

In some embodiments, the first end 88 of the link 86 includes a pin 92 positionable within the track 96. In some embodiments, rotation of the cam 76 causes linear movement of the carriage 78. For example, rotation of the cam 76 may cause the pin 92 to move along the track 96. In some embodiments, the track 96 confines the pin 92 to linear movement such that rotation of the cam 76 causes movement of the first end 88 to move linearly (e.g., upwardly). In some embodiments, the first end 88 of the link 86 moves the carriage 78 (e.g., linearly) such that the blocking element 68 is moved from the first position to the second position.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. The words "inwardly" and "outwardly" refer to directions toward and away from, respectively, the geometric center of the closure locking system. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A lock module for a vertically movable closure, the vertically movable closure having a bottom bar, the lock module comprising:

a housing configured for mounting to or within a bottom portion of a frame, wherein the frame is adjacent to the vertically movable closure;

a lock pawl moveable between an extended position and retracted positions, the retracted positions comprising an upward retracted position and a downward retracted position, wherein the lock pawl is biased towards the extended position by a biasing element coupled to the lock pawl, wherein the lock pawl extends from the housing by a greater distance away from the housing in the extended position than in the retracted positions, wherein the lock pawl is moved by contact with the bottom bar of the vertically movable closure into the upward retracted positon as the vertically movable closure moves from a closed position to an open position and wherein the lock pawl moves into the downward retracted position as the vertically movable closure moves from the open position to the closed position via contact with the bottom bar;

a carriage mounted within or to the housing, the carriage comprising sidewalls that define an open box, the carriage comprising a blocking element configured to be actuated to block the lock pawl from moving from the extended position to the retracted positions, wherein the entire blocking element is configured to move between a first position and a second position along a blocking element path that is along a linear axis defined by horizontal movement of the blocking element along the sidewalls of the open box of the carriage; and an actuator coupled to the blocking element, wherein the lock module being in a locked configuration when the actuator is activated to move the blocking element from the first position to the second position along the blocking element path to block movement of the lock pawl from the extended position to the retracted positions, which blocks the movement of the vertically movable closure via contact of the bottom bar with the lock pawl.

2. The lock module of claim 1, wherein the actuator comprises a translatable portion that translates along an axis and the lock pawl is configured to pivot about a lock pawl axis.

3. The lock module of claim 1, wherein the actuator comprises a powered actuator.

4. The lock module of claim 3, wherein the powered actuator comprises a solenoid.

5. The lock module of claim 1, wherein the biasing element comprises a spring.

6. The lock module of claim 1, wherein the lock pawl includes a lip and the blocking element engages the lip to prevent movement of the lock pawl from the extended position to the upward retracted position.

7. The lock module of claim 1, further comprising a sensor that senses when the blocking element is in the second position, the sensor transmitting a signal to a processor that allows operation of a closure motor after transmission of the signal.

8. The lock module of claim 1, wherein the lock pawl pivots about a lock pawl axis as the lock pawl moves between the extended position and the retracted positions.

9. The lock module of claim 1, wherein the lock pawl is in the extended position as the actuator moves the blocking element from the first position to the second position along the blocking element path.

10. The lock module of claim 1, further comprising a controller configured to send an activation signal to the actuator.

11. The lock module of claim 1, further comprising a manual actuator to move the lock pawl from the extended position to the retracted positions.

12. A closure assembly having a vertically movable closure, the closure assembly comprising:

a first frame coupled to a wall defining a portion of an opening;

the vertically movable closure coupled to the first frame, the vertically movable closure comprising a bottom bar and moveable from an open position, wherein the vertically movable closure allows access through the opening to a closed position, and wherein the vertically movable closure at least partially obstructs the opening; and a lock module located within the first frame, the lock module comprising:

a housing;

a lock pawl moveable between an extended position and retracted positions, wherein the retracted positions comprising an upward retracted position and a downward retracted position, wherein the lock pawl is biased towards the extended position by a biasing element coupled to the lock pawl, wherein the lock pawl extends from the housing by a greater distance away from the housing in the extended position than in the retracted positions, wherein the lock pawl is moved by contact with the bottom bar of the vertically movable closure into the upward retracted position as the vertically movable closure moves from the closed position to the open position and wherein the lock pawl moves into the downward retracted position as the vertically movable closure moves from the open position to the closed position via contact with the bottom bar;

a carriage mounted within or to the housing, the carriage comprising sidewalls that define an open box, the carriage comprising a blocking element configured to be actuated to block the lock pawl from moving from the extended position to the retracted positions, wherein the entire blocking element is configured to move between a first position and a second position along a blocking element path that is along a linear axis defined by horizontal movement of the blocking element along the sidewalls of the open box of the carriage; and an actuator coupled to the blocking element, wherein the lock module being in a locked configuration when the actuator is activated to move the blocking element from the first position to the second position along the blocking element path to block movement of the lock pawl from the extended position to the retracted positions, which blocks the movement of the vertically movable closure via contact of the bottom bar with the lock pawl.

13. The closure assembly of claim 12, wherein the actuator is coupled to the first frame.

14. The closure assembly of claim 12, further comprising a second frame coupled to a wall defining another portion of the opening, wherein the bottom bar extends substantially from the first frame to the second frame.

15. The closure assembly of claim 14, wherein the lock pawl pivots about a lock pawl axis as the lock pawl moves between the extended position and the retracted positions, and wherein the lock pawl axis is substantially parallel to a major axis of the bottom bar.

16. The closure assembly of claim 12, wherein the first frame includes a closure track such that the vertically movable closure moves within the closure track between the open position and the closed position.

17. The closure assembly of claim 16, wherein the lock pawl extends into the closure track when the lock pawl is in the extended position.

18. The closure assembly of claim 17, wherein the lock pawl is at least partially out of the closure track when the lock pawl is in the retracted positions.

* * * * *